United States Patent
Bosch Vicente et al.

(10) Patent No.: US 12,283,287 B2
(45) Date of Patent: *Apr. 22, 2025

(54) AUDIO STEM IDENTIFICATION SYSTEMS AND METHODS

(71) Applicant: Spotify AB, Stockholm (SE)

(72) Inventors: Juan José Bosch Vicente, Paris (FR); François Pachet, Paris (FR); Pierre Roy, Paris (FR); Mathieu Ramona, Paris (FR); Tristan Jehan, Brooklyn, NY (US)

(73) Assignee: Spotify AB, Stockholm (SE)

( * ) Notice: Subject to any disclaimer, the term of this patent is extended or adjusted under 35 U.S.C. 154(b) by 17 days.

This patent is subject to a terminal disclaimer.

(21) Appl. No.: 18/090,228

(22) Filed: Dec. 28, 2022

(65) Prior Publication Data

US 2023/0223037 A1    Jul. 13, 2023

Related U.S. Application Data

(63) Continuation of application No. 17/202,841, filed on Mar. 16, 2021, now Pat. No. 11,568,886, which is a (Continued)

(51) Int. Cl.
*G06F 17/30* (2006.01)
*G06F 16/632* (2019.01)
(Continued)

(52) U.S. Cl.
CPC ............ *G10L 25/51* (2013.01); *G06F 16/634* (2019.01); *G06N 3/04* (2013.01); *G06N 3/08* (2013.01); *G10L 25/30* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 7,024,424 B1 * 4/2006 Platt ................. G06F 16/639
707/999.005
7,812,241 B2 * 10/2010 Ellis ................. G10H 1/40
84/612

(Continued)

FOREIGN PATENT DOCUMENTS

EP        751471      6/1996
EP       3796306      3/2021
(Continued)

OTHER PUBLICATIONS

Aucouturier; J.-J., Pachet, F. and Sandler, M. "The Way It Sounds: Timbre Models for Analysis and Retrieval of Polyphonic Music Signals." IEEE Transactions of Multimedia, 7(6):1028-1035 (Dec. 2005).

(Continued)

*Primary Examiner* — Hung D Le
(74) *Attorney, Agent, or Firm* — Morgan, Lewis & Bockius LLP

(57) ABSTRACT

Methods, systems and computer program products are provided for determining acoustic feature vectors of query and target items in a first vector space, and mapping the acoustic feature vectors to a second vector space having a lower dimension. The distribution of vectors in the second vector space can then be used to identify items from the same songs, and/or items that are complementary. A mapping function is trained using a machine learning algorithm, such that complementary audio items are closer in the second vector space than the first, according to a given distance metric.

18 Claims, 10 Drawing Sheets

Related U.S. Application Data continuation of application No. 16/575,926, filed on Sep. 19, 2019, now Pat. No. 10,997,986.

(51) Int. Cl.
*G06N 3/04* (2023.01)
*G06N 3/08* (2023.01)
*G10L 25/30* (2013.01)
*G10L 25/51* (2013.01)

(56) References Cited

U.S. PATENT DOCUMENTS

| | | | |
|---|---|---|---|
| 8,073,854 B2* | 12/2011 | Whitman | G06F 16/634 707/916 |
| 10,236,006 B1* | 3/2019 | Gurijala | G10L 19/02 |
| 10,303,771 B1* | 5/2019 | Jezewski | G06N 3/04 |
| 10,671,666 B2* | 6/2020 | Jin | G06F 16/686 |
| 10,997,986 B2 | 5/2021 | Vincente | |
| 11,568,886 B2 | 1/2023 | Vincente | |
| 2004/0093202 A1* | 5/2004 | Fischer | G10H 1/0041 704/503 |
| 2004/0215447 A1* | 10/2004 | Sundareson | G10L 19/0208 704/E19.01 |
| 2005/0247185 A1 | 11/2005 | Uhle | |
| 2008/0021851 A1* | 1/2008 | Alcalde | G06Q 30/0603 706/21 |
| 2008/0288255 A1* | 11/2008 | Carin | G06F 18/295 704/256.1 |
| 2009/0044689 A1* | 2/2009 | Komori | G11B 27/034 84/625 |
| 2009/0049082 A1* | 2/2009 | Slaney | G06F 16/637 |
| 2010/0199833 A1* | 8/2010 | McNaboe | G10H 1/0025 84/625 |
| 2011/0004642 A1* | 1/2011 | Schnitzer | G06F 16/61 707/705 |
| 2012/0237041 A1* | 9/2012 | Pohle | G10H 1/0008 381/56 |
| 2012/0300950 A1* | 11/2012 | Usui | G10H 1/0008 381/56 |
| 2013/0226957 A1* | 8/2013 | Ellis | G06F 16/634 707/769 |
| 2014/0270263 A1* | 9/2014 | Fejzo | H04S 3/00 381/119 |
| 2015/0242750 A1* | 8/2015 | Anderson | G06Q 30/0631 706/50 |
| 2017/0116533 A1* | 4/2017 | Jehan | G06F 16/683 |
| 2017/0154216 A1* | 6/2017 | Kennedy | G06V 30/418 |
| 2017/0236504 A1* | 8/2017 | Brooker | G06Q 50/184 84/609 |
| 2018/0137845 A1 | 5/2018 | Prokop | |
| 2018/0341704 A1* | 11/2018 | Barkan | G06F 16/639 |
| 2019/0318060 A1* | 10/2019 | Brenner | H04N 21/8113 |
| 2020/0074982 A1* | 3/2020 | McCallum | G10L 15/04 |
| 2020/0320388 A1 | 10/2020 | Lyske | |
| 2021/0049989 A1 | 2/2021 | Bretan | |
| 2021/0090536 A1 | 3/2021 | Pachet | |
| 2021/0090590 A1 | 3/2021 | Vincente | |
| 2021/0294840 A1 | 9/2021 | Lee | |
| 2021/0350778 A1* | 11/2021 | Kokkinis | G10H 1/0025 |
| 2023/0260488 A1 | 8/2023 | Vicente | |
| 2023/0260492 A1 | 8/2023 | Vicente | |

FOREIGN PATENT DOCUMENTS

| | | |
|---|---|---|
| WO | 2015/035492 | 3/2015 |
| WO | 2015/154159 | 10/2015 |
| WO | 2016/189307 | 12/2016 |
| WO | 2017/030661 | 2/2017 |
| WO | 2019/084419 | 5/2019 |

OTHER PUBLICATIONS

Ellis, Daniel et al., "Identifying 'Cover Songs' with Chroma Features and Dynamic Programming Beat Tracking", 2007, 4 pages.
European Communication in Application 20174092.5, mailed Dec. 18, 2020, 8 pages.
European Communication in Application 20174092.5, mailed Aug. 23, 2021, 9 pages.
European Communication in Application 20174093.3, mailed Jun. 2, 2021, 13 pages.
European Communication in Application 20174093.3, mailed Dec. 3, 2020, 11 pages.
European Communication in Application 20205650.3, mailed Feb. 14, 2022, 7 pages.
European Extended Search Report in Application 20174092.5, mailed Sep. 1, 2020, 8 pages.
European Extended Search Report in Application 20174093.3, mailed Sep. 1, 2020, 12 pages.
European Extended Search Report in Application 20205650.3, mailed May 7, 2021, 16 pages.
European Extended Search Report in Application 20205651.1, mailed May 3, 2021, 13 pages.
European Minutes of the Oral Proceedings in Application 20174093.3, mailed Nov. 3, 2021, 13 pages.
European Result of Consultation in Application 20174093.3, mailed Oct. 20, 2021, 5 pages.
European Result of Consultation in Application 20174092.5, mailed Jan. 24, 2022, 3 pgs.
European Result of Consultation in Application 20174092.5, mailed Dec. 16, 2021, 7 pgs.
European Written Submission in Preparation to Oral Proceedings in Application 20174093.3, mailed Oct. 8, 2021, 5 pages.
Jehan, T. "Creating music by listening," PhD, MIT Media Lab (2005).
Lee, Jongpil, et al., "Disentangled Multidimensional Metric Learning for Music Similarity", ARXIV.org, Aug. 9, 2020, 5 pages.
Marco A. Martinez Ramirez, Joshua D. Reiss. "Deep Learning and Intelligent Audio Mixing." Proceedings of the 3rd Workshop on Intelligent Music Production, Salford, UK (Sep. 15, 2017).
Marolt, M., "A Mid-Level Representation for Melody-Based Retrieval in Audio Collections", IEEE Transactions on Multimedia, vol. 10, No. 8, Dec. 1, 2008, 9 pages.
Meinard Muller et al., "Multimodal Music Processing," DFU, vol. 3 (2012). Available at: https://drops.dagstuhl.de/opus/volltexte/dfu-complete/dfu-vo13-complete.p-df.
Oderkerken, Daphne, et al., "Decibel: Improving Audio Chord Estimation for Popular Music by Alignment and Integration of Crowd-Sourced Symbolic Representations", ARXIV.org, Feb. 22, 2020, 81 pages.
Van den Oord, Aaron, Sander Dieleman, and Benjamin Schrauwen. "Deep content-based music recommendation." Advances in neural information processing systems (2013).
Veit, Andreas, et al., "Conditional Similarity Networks", 2017 IEEE Conference on Computer Vision and Pattern Recognition (CVPR), Jul. 21, 2017, 9 pages.
European Communication in Application 20205651.1, mailed Jan. 10, 2024, 5 pages.

\* cited by examiner

AUDIO STEM IDENTIFICATION SYSTEMS AND METHODS

CROSS REFERENCE TO RELATED APPLICATIONS

This application claims priority to and is a Continuation of U.S. patent application Ser. No. 17/202,841, filed Mar. 16, 2021, which is a Continuation of U.S. patent application Ser. No. 16/575,926, filed Sep. 19, 2019, now U.S. Pat. No. 10,997,986, issued on May 4, 2021, which applications are incorporated herein by reference in their entirety herein.

TECHNICAL FIELD

Example aspects described herein generally relate to identification of musical audio files, and more particularly to an audio stem identifier and methods for audio stem identification.

BACKGROUND

In digital music, songs are often made up of an assembly of various preexisting and/or new audio stems. An audio stem is a discrete or grouped collection of audio sources mixed together to be dealt with downstream as one unit. For instance stems may consist of all of the string instruments, a full orchestra, just background vocals, only the percussion instruments, a single drum set, or any other grouping of audio sources that make up a music track. Stems prepared in this fashion may be blended together to form a music track. The arrangement of the stems and the stems themselves can be modified using various audio manipulation tools such as mixers. Stem-mixers, for example, are used to mix audio material based on creating groups of audio tracks and processing them separately prior to combining them into a final master mix. Stems are also sometimes referred to as submixes or subgroups.

Audio stems can be stored, for example in a database. Such a stem database of audio stems can be built by collecting songs made from an initial database of stems which keeps growing. It can also be built or populated by source separation on existing songs (e.g., a catalogue of songs from a media distribution service).

One technical problem that arises relates to determining which audio stems in the stem database have been used to make a music track. This problem becomes more apparent as the stem database grows as users cannot listen to all the stems in the database to determine which stems have been used.

Solutions currently offered to creators include services such as Splice, or within DAWs (i.e. Digital Audio Workstation) like Apple Logic or Ableton Live are based on a search which is powered by tags. However, there exists no known technical solution to the above-described identification problem.

Accordingly, given a database of audio content including stems and/or combinations of stems, a user may wish to find which of the audio stem(s) in the stem database have been used to make a music track upon providing a query.

SUMMARY

In one embodiment, stems obtained from plural songs are fed into a machine learning processor to train a model. The trained model, in turn, is used to predict a stem from a stem database that has a probability of being related to input stem(s). The output can be in the form of one or more probability vectors, each probability vector indicating a probability that a new stem is related.

In accordance with other embodiments, instead of identifying only stems that have been used, an audio similarity algorithm first finds other audio stems that sound similar to the proposed stems. This extends considerably the choice proposed to the user and ensures that the system identifies all possible stems that could have been used, and not just a single option.

In some embodiments, identifications based on a lead sheet (and a similarity measure between lead sheets or chord sequences or melodies) are provided.

In an example embodiment there is provided a method for identifying an audio stem. The method includes storing, on a stem database, a plurality of audio stems $(t_1, \ldots, t_N)$; storing, on a song database, a plurality of songs $(S_1, \ldots, S_P)$ made with at least a subset of the plurality of the audio stems $(t_1, \ldots, t_N)$; receiving an at least partially composed song $(S^*)$/a query audio stem having a predetermined number of pre-selected stems (k); and producing a probability vector (or relevance value or ranking) for each stem $(t_1, \ldots, t_N)$ to be related to the at least partially composed song $(S^*)$.

In some embodiments, the method further includes predicting, using a trained machine learning model, at least one stem from the stem database having a probability value above a predetermined threshold, thereby defining the at least one stem as being complementary to the predetermined number of preselected stems(k).

In some embodiments, the method further includes training, using a machine learning processor, the machine learning model based on any one of (i) a measure of success of a stem, (ii) a rank order of sociometric status values corresponding to a plurality of songs including at least the stem, (iii) a plurality of stems obtained from plural songs, or any combination of (i), (ii) and (iii).

In some embodiments, the method further includes, for each audio stem (t) of the plurality of audio stems $(t_1, \ldots, t_N)$: initializing a corresponding relevance value $(R_1, \ldots, R_N)$ to zero; for each song (S) of the plurality of songs $(S_1, \ldots, S_P)$ containing at least one of the audio stems $(t_1, \ldots, t_N)$: computing, using a similarity function, a similarity value of the song (S) to the at least partially composed song $(S^*)$; determining, using a quantitative sociometric function, a sociometric status value of the song (S); and computing the probability vector (or ranking or relevance value) based on the similarity value and the sociometric status value.

In some embodiments, similarity function is based on a cosine function, and in some embodiments, the quantitative sociometric function is based on a number of streams of the song (S).

In some embodiments, at least one of the pre-selected stems (k) is not in the stem database.

In some embodiments, at least one of the pre-selected stems (k) is in the stem database.

In some embodiments, the method further includes determining at least one of the plurality of stems $(t_1, \ldots, t_N)$ having a relevance value greater than a predetermined threshold.

In some embodiments, the method further includes determining a distance between two songs $d_{cos}(s,s')$ by calculating a cosine distance between vectors, wherein s is song vector according to $s \in \{0,1\}^N$, wherein s is a vector with a value of one (1) at position i if stem $t_i$ is used in s; receiving an audio similarity measure between audio stems, such that a distance for any two stems is according to $d_{audio}(t_i,t_j) \in [0,1]$; determining a distance between songs, based on $d_{audio}$ by defining, first, a distance between a song and a stem, according to: $d_{audio}(s, t_i)=\min \{d_{audio}(t_i,t_j), \text{ for } t_j \in s\}$; and determining a distance between two songs (s,s') according to: $d_{audio}(s,s')=avg_{t' \in s'} d_{audio}(s,t')$.

In another embodiment, a stem identification system is provided. The stem identification system includes a stem database configured to store a plurality of audio stems $(t_1, \ldots, t_N)$; a song database configured to store a plurality of songs $(S_1, \ldots, S_P)$ made with at least a subset of the plurality of the audio stems $(t_1, \ldots, t_N)$; and a stem processor configured to: receive an at least partially composed song (S*) having a predetermined number of pre-selected stems (k), and produce a probability vector (or relevance value or ranking) for each stem $(t_1, \ldots, t_N)$ to be complementary to the at least partially composed song (S*).

In some embodiments, the stem processor is further configured to: predict, using a trained machine learning model, at least one stem from the stem database having a probability value above a predetermined threshold, thereby defining the at least one stem as being complementary to the predetermined number of preselected stems(k).

In some embodiments, the stem identification system further includes a machine learning processor configured to train the machine learning model based on any one of (i) a measure of success of a stem, (ii) a rank order of sociometric status values corresponding to a plurality of songs including at least the stem, (iii) a plurality of stems obtained from plural songs, or any combination of (i), (ii) and (iii).

In some embodiments, the stem processor is further configured to: for each audio stem (t) of the plurality of audio stems $(t_1, \ldots, t_N)$:
initialize a corresponding relevance value $(R_1, \ldots, R_N)$ to zero;
for each song (S) of the plurality of songs $(S_1, \ldots, S_P)$ containing at least one of the audio stems $(t_1, \ldots, t_N)$:
compute, using a similarity function, a similarity value of the song (S) to the at least partially composed song (S*);
determine, using a sociometric status function, a sociometric status value of the song (S); and
compute the probability vector (or ranking or relevance value) based on the similarity value and the sociometric value.

In some embodiments, the similarity function is based on a cosine function.

In some embodiments, the quantitative sociometric function is based on a number of streams of the song (S).

In some embodiments, at least one of the pre-selected stems (k) is not in the stem database.

In some embodiments, at least one of the pre-selected stems (k) is in the stem database.

In some embodiments, the stem processor is further configured to determine at least one of the plurality of stems $(t_1, \ldots, t_N)$ having a relevance value greater than a predetermined threshold.

In some embodiments, the stem processor is further configured to:
determine a distance between two songs $d_{cos}(s,s')$ by calculating a cosine distance between vectors, wherein s is song vector according to $s \in \{0,1\}^N$, wherein s is a vector with a value of one (1) at position i if stem $t_i$ is used in s;
receive an audio similarity measure between audio stems, such that a distance for any two stems is according to $d_{audio}(ti,tj) \in [0,1]$;
determine a distance between songs, based on $d_{audio}$ by defining, first, a distance between a song and a stem, according to:
$d_{audio}(s, t_i)=\min \{d_{audio}(t_i,t_j), \text{ for } t_j \in s\}$; and
determine a distance between two songs (s,s') according to:
$d_{audio}(s,s')=avg_{t' \in s'} d_{audio}(s,t')$.

Example aspects also include methods, systems and computer program products for determining acoustic feature vectors of query and target items in a first vector space, and mapping the acoustic feature vectors to a second vector space having a lower dimension. The distribution of vectors in the second vector space can then be used to identify items from the same songs, and/or items that are complementary. This can be achieved by training a mapping function using a machine learning algorithm, such that complementary audio items are closer in the second vector space than the first, according to a given distance metric. In this way, complementary items can be more easily identified. The lower dimensionality of the second vector space allows the identification to be performed more efficiently.

In yet another example embodiment, a non-transitory computer-readable medium having stored thereon one or more sequences of instructions for causing one or more processors to perform the methods described herein is provided.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Figure 1:
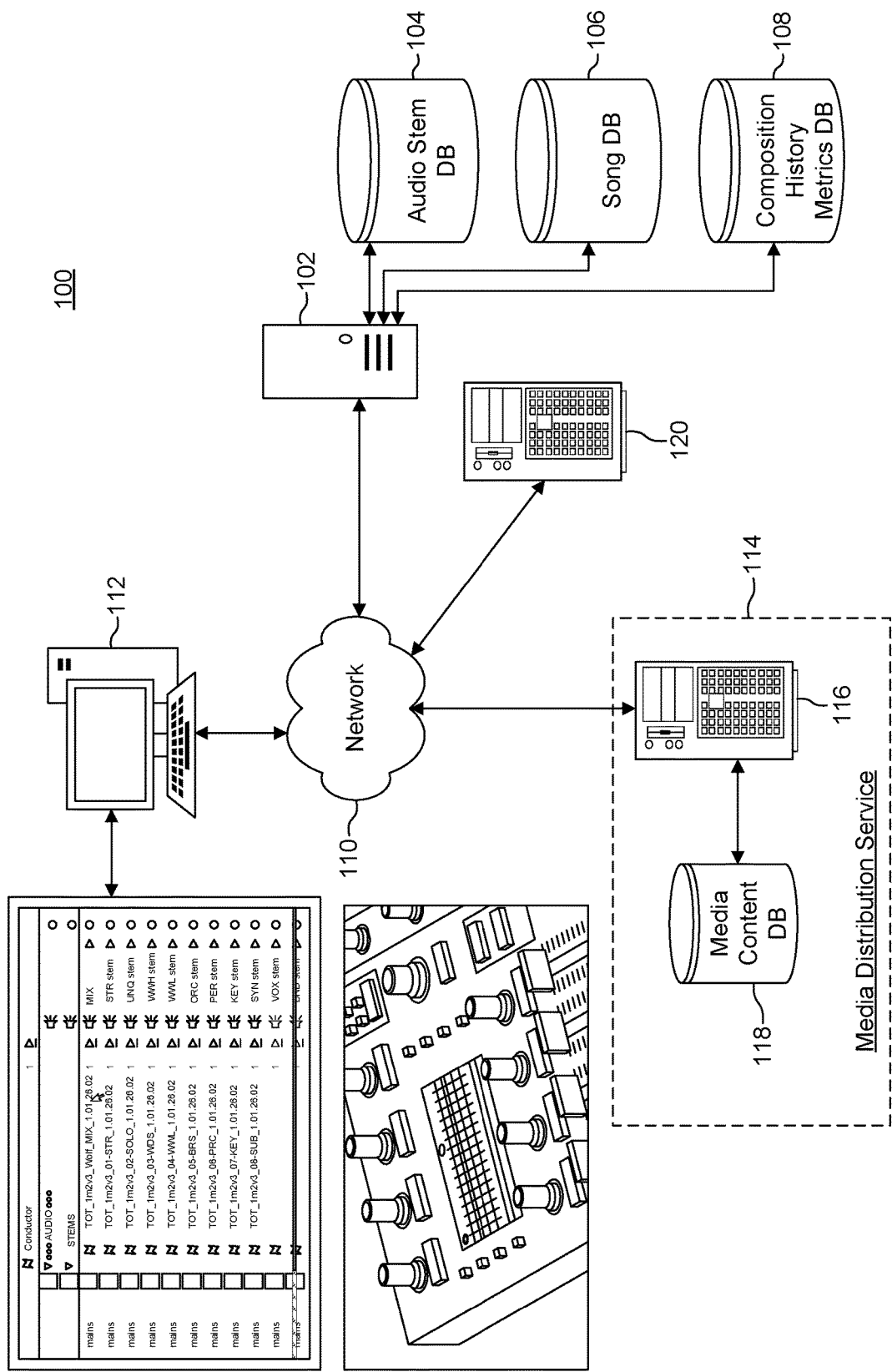
FIG. 1 illustrates an audio stem identification system in accordance with an example embodiment of the present invention.

The example embodiments of the invention presented herein are directed to methods, systems and computer program products for providing stem identification. This description is not intended to limit the application of the example embodiments presented herein. In fact, after reading the following description, it will be apparent to one skilled in the relevant art(s) how to implement the following example embodiments in alternative embodiments (e.g., as a dedicated hardware device, domains other than audio, such as video and multimedia podcasts). In addition, while the example embodiments are described in terms of audio stems, it should be understood that the same techniques can apply to lead sheets that can be converted into audio stems. A media content item is an item of media content, including audio, video, or other types of media content, which may be stored in any format suitable for storing media content. Non-limiting examples of media content items include songs, music, albums, audiobooks, music videos, movies, television episodes, podcasts, other types of audio or video content, and portions or combinations thereof.

Generally, in one example implementation, collaborative filtering (CF) and audio similarity (AS) are used as mechanisms for identifying audio stems. Collaborative filtering is a method of making automatic predictions (filtering) about the interests of a user by collecting preferences or taste information from many users (collaborating). Audio similarity is a method of measuring the similarity between audio samples from their waveforms.

In some embodiments, identifying audio stems involves defining a measure success for groups of audio stems which have already been used, and ranking individual audio stems based on a rank order of sociometric status values corresponding to a plurality of songs including one or more of the audio stems.

The identification can be purely content-based (one audio stem complements other proposed audio stems), or personalized (an audio stem complements other proposed audio stems, given what is known about a composition history metrics of a particular composer). For example, a composer may gravitate towards more unusual sounds, complex rhythmic patterns, or rich harmonies. Such attributes can be used to filter proposed audio stems. Ranking can be weighted by a set of underlying or exposed metrics, such as acoustic properties, quantitative sociometrics, uniqueness, etc.

In another example implementation, acoustic feature vectors of query and target items in a first vector space are determined. The acoustic feature vectors are mapped to a second vector space having a lower dimension. In turn, the distribution of vectors in the second vector space can then be used to identify items from the same songs, and/or items that are complementary. This can be achieved by training a mapping function using a machine learning algorithm, such that complementary audio items are closer in the second vector space than the first, according to a given distance metric. In this way, complementary items can be more easily identified. The lower dimensionality of the second vector space allows the identification to be performed more efficiently.

FIG. 1 illustrates an audio stem identification system 100 in accordance with an example embodiment of the present invention. A stem identification processor 102 is communicatively coupled to one or more databases. In one example embodiment, stem identification processor 102 is coupled to an audio stem database 104. In some embodiments, stem identification processor 102 is coupled to a song database 106. And in some embodiments, stem identification processor 102 is coupled to a composition history metrics database 108.

Audio stem database 104 is arranged to store plural audio stems. In some embodiments, audio stem database 104 stores audio stems in an encoded format (e.g., .wav, .mp3, .m4a, .ogg, .wma, etc). One or more audio stems that are stored on the audio stem database 104 can be retrieved and inserted into a song during a song creation process. In some embodiments, other audio stems are retrieved from other sources via network 110 or local source such as a memory store or a stem creation application (not shown). Song database 106 may be employed to store songs produced using stems. In some embodiments, song database 106 is built progressively by collecting songs that are produced using the stems stored in audio stem database 104.

Composition history metrics database 108 stores records associated with composers. Particularly composition history metrics database 108 stores records identifying attributes associated with a composition history metrics of a composer. For example, composition history metrics database 108 can be configured to store records identifying the types of sounds, rhythmic patterns, harmonies, and the like, that a composer typically uses. In some embodiments, composition history metrics database 108 stores rankings that are weighted by a set of composition metrics. In one implementation, the composition metrics include data representing acoustic properties, sociometric ranking values, uniqueness values, and the like.

An audio stem use record can be maintained as well. In some embodiments an audio stem use record is maintained in a database such as the audio stem database 104. The audio stem record of each audio stem is used to maintain a record of which stems have been retrieved from audio stem database 104 to create a song that is stored in the song database 106. Thus, for each of the songs in the song database, which audio stems have been used is known.

In some embodiments, stem identification processor 102 is communicatively coupled to a media distribution service 114 that includes a music distribution server 116 arranged to distribute media content items and a media content database 118 that stores the media content items. The media distribution service 114 can provide streams of media content or media content items for downloading to stem identification processor 102.

Thus audio stem database 104 can be built or populated in different ways. In one embodiment, stem identification processor 102 performs source separation on the media content items to separate from the songs the individual stems that, when mixed, form the song.

In some embodiments, the audio stems including their respective attributes are encoded and stored in audio stem database 104 for later processing.

Song database 106 is built by progressively collecting songs that are produced using stems retrieved from audio stem database 104.

One technical challenge involves identifying a stem to a user during the production process based on audio stems already selected for a song being produced. Another technical challenge involves identifying a stem to a user during the production process where no stems that have been pre-stored in audio stem database 104 have been used. These technical problems become more challenging as the audio stem database 104 grows, as users cannot listen to all the stems to make their choice. As a consequence, identifying an audio stem for combining with existing audio stems becomes a significant technical challenge.

In an example implementation, stem identification processor 102 receives a partially composed media content item (e.g., a song) in the form of a set of stems to be mixed by a client device executing an audio editor application 112 (referred to simply as audio editor 112). In some examples the partially media content item is in the form of a composition expressed on a lead sheet encoded in a music interchange format.

In some embodiments, stem identification processor 102 includes at least one processor and a non-transitory memory storing instructions. When the instructions are executed by the processor(s), the processor(s) performs the functions described herein for stem identification.

Example Stem Identification Using Collaborative Filtering

Figure 2:
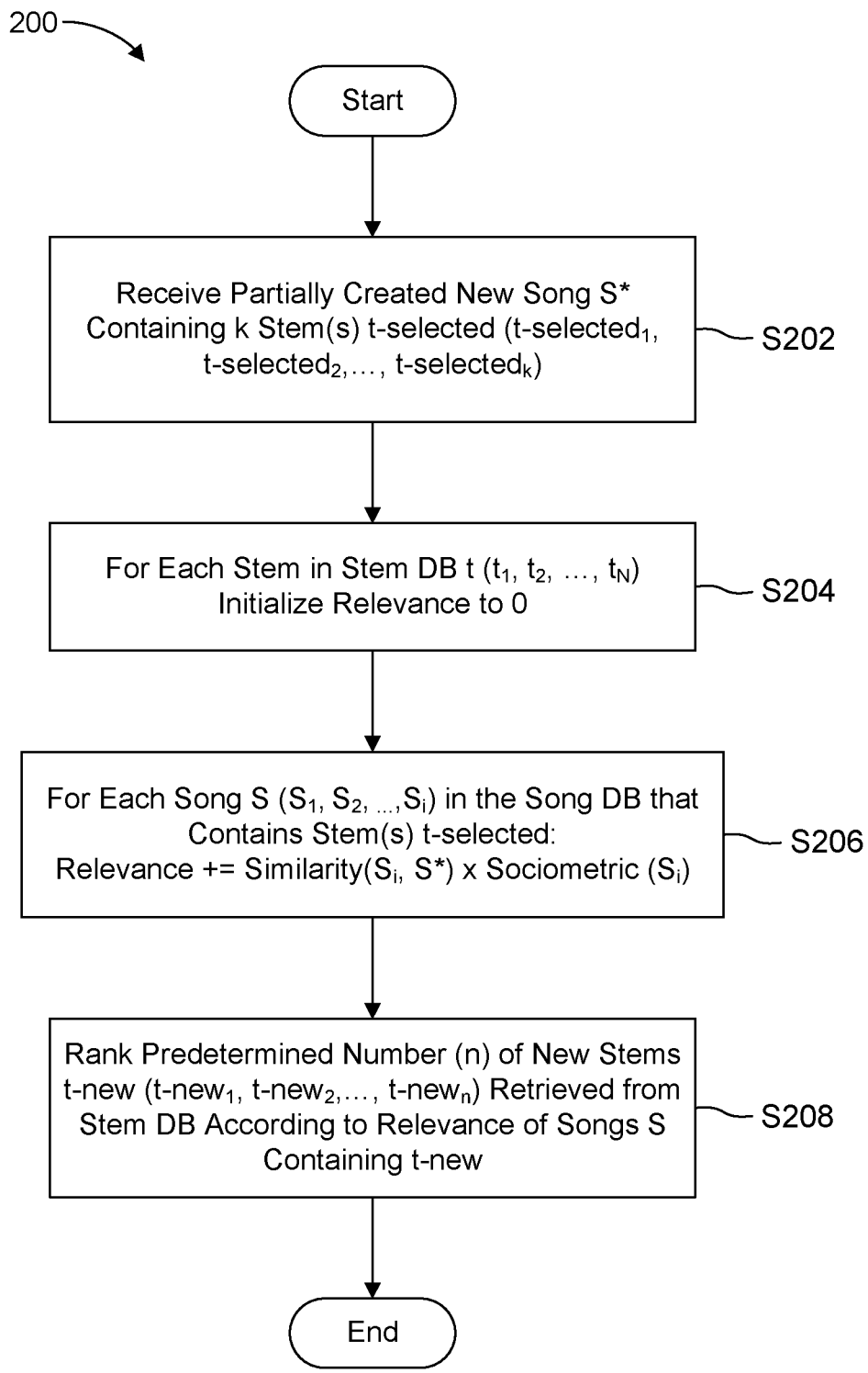
FIG. 2 illustrates a stem identification process utilizing collaborative filtering according to an example embodiment of the present invention.

FIG. 2 illustrates a stem identification process 200 according to an example embodiment of the present invention. In this example embodiment, stem identification is based on collaborative filtering (CF). The stem identification process 200 can be stored as instructions in a non-transitory computer readable medium that when executed by a stem processor (e.g., stem processor 410 described below in connection with FIG. 4) cause the stem processor to perform process 200.

Generally, users generate media content items (e.g., via an audio editor 112) by assembling a group of audio stems. The assembled group of stems are sometimes herein referred to as pre-selected group of stems, simply selected group of stems, k selected audio stem(s), or t-selected (t-selected$_1$, t-selected$_2$, ..., t-selected$_k$, where k is an integer). If any of the songs in song database 106 that has the selected group of audio stems have relatively high quantitative sociometric values associated with them, this is indicative that the selected group of audio stems was successfully launched, a determination is made that the selected group of audio stems may correspond to a new group of audio stems in the song (i.e., the song from song database 106). The measure of success can be any known or future developed measure of success. For example a measure of success can be based on a number of streams of a song containing the corresponding group of stems through media distribution service 114. This may be the case, for example, in a certain context, such as a playlist in a given music genre. In an example embodiment, for instance, only the playlists in the given music genre are considered to compute a streaming count.

Referring to FIG. 2, in this example, there is provided an audio stem database 104 storing individual stems t (t$_1$, t$_2$, ..., t$_N$, where N is an integer). There is also provided a song database 106 containing songs S (S$_1$, S$_2$, ..., S$_P$, where P is an integer) made with stems t. Stems t are available to be retrieved by using a stem processor executing stem identification process 200.

In an example implementation, S* represents a new song, where k selected audio stem(s) t-selected (t-selected$_1$, t-selected$_2$, ..., t-selected$_k$), have been pre-selected to be included in the new song S*. Stem identification processor 102 identifies one or more new audio stems t-new (t-new$_1$, t-new$_2$, ..., t-new$_n$, where n is an integer) as follows.

In block S202, each of the k selected audio stem(s) (t-selected$_1$, t-selected$_2$, ..., t-selected$_k$) are received. In turn, each of the k selected audio stems (t-selected) are processed to determine if there exists one or more corresponding new audio stem(s) t-new (t-new$_1$, t-new$_2$, ..., t-new$_n$, where n is an integer) in audio stem database 104. In some embodiments, new audio stems t-new are in audio stem database 104 which contains stems t (t$_1$, t$_2$, ..., t$_N$, where N is an integer).

The new audio stem(s) t-new can be of a certain type (e.g. a guitar stem, drum stem, and the like), correspondingly. In some example embodiments, a corresponding new audio stem t-new is determined by using a collaborative filtering (CF) algorithm applied to an existing song S (S$_1$, S$_2$, ..., S$_P$, where P is an integer) stored in song database 106. As a result of CF, one or more stems that was already used successfully in existing songs Sin song database 106 (i.e., new audio stem(s) t-new) is identified. In this example, the identification is based on a relevance computation process S204, S206, S208 as follows.

In block S204, for each stem t (t$_1$, t$_2$, ..., t$_N$) in the audio stem database 104, a variable relevance is initialized to 0 (i.e., relevance←0).

In block S206, for each song S$_i$ in the audio stem database 104, where i is an integer, and which contains the k selected stem(s) t-selected (t-selected$_1$, t-selected$_2$, ..., t-selected$_k$), a relevance value is calculated according to the following equation (1):

$$\text{relevance} += \text{similarity}(S_i, S^*) \times \text{sociometric}(S_i) \qquad (1)$$

In block S208, the computed relevance value (i.e., relevance) is, in turn, used to rank each stem t (t$_1$, t$_2$, ..., t$_N$) in the audio stem database 104 that are contained in songs S$_i$ to generate N-ranked stems t-ranked (t-ranked$_1$, t-ranked$_2$, ..., t-ranked$_N$, where N is an integer). In turn, n new stem(s) t-new (t-new$_1$, t-new$_2$, ..., t-new$_n$, where n is an integer) are selected from the ranked stems t-ranked$_N$ based on the stems with highest relevance. In some embodiments, the n new stems t-new do not include the k selected stem(s) t-selected. In an example implementation, the pre-selected stems t-selected are filtered from the ranked stems t-ranked$_N$.

The similarity function, similarity( ), can be defined in several ways. In an example embodiment, the similarity function, similarity( ), is the cosine distance between the two songs, represented in the stem space, where the distance between two songs d cos(s,s') is the cosine distance between vectors representing the song s and song s'. This, in this example implementation, song similarity is purely based on stems. If, for instance, two songs use the same stems for Bass, Drum and Guitar, and differ only in that one song (and not the other) uses a Piano stem, they will be considered very similar. On the contrary, if the two songs do not have any stem in common, they will be considered very dissimilar. This is regardless of the audio similarity.

In another example embodiment, however, audio similarity between stems could be used instead of simply checking stem identity.

In some embodiments, the process involves computing a tradeoff between 1) the number of songs in audio stem database 104 S (S$_1$, S$_2$, ..., S$_P$, where P is an integer) in which a given stem to identify appears together with the k selected audio stems that have been pre-selected for the new song S*, and 2) the rank order of sociometric values of the songs computing by the quantitative sociometric function sociometric( ). In an example implementation, the identification procedure is analogous to a collaborative filtering (CF) identification used to identify songs (e.g., if people who like songs X and Y also like song Z, then a listener who likes X and Y should be identified Z). Here songs are replaced by stems: if many songs with stems X and Y use also stem Z, then if a new song already uses X and Y, we should identify Z. Function sociometric( ) counts the number of streams of a given song.

Example Stem Identification Using Audio Similarity

Figure 3:
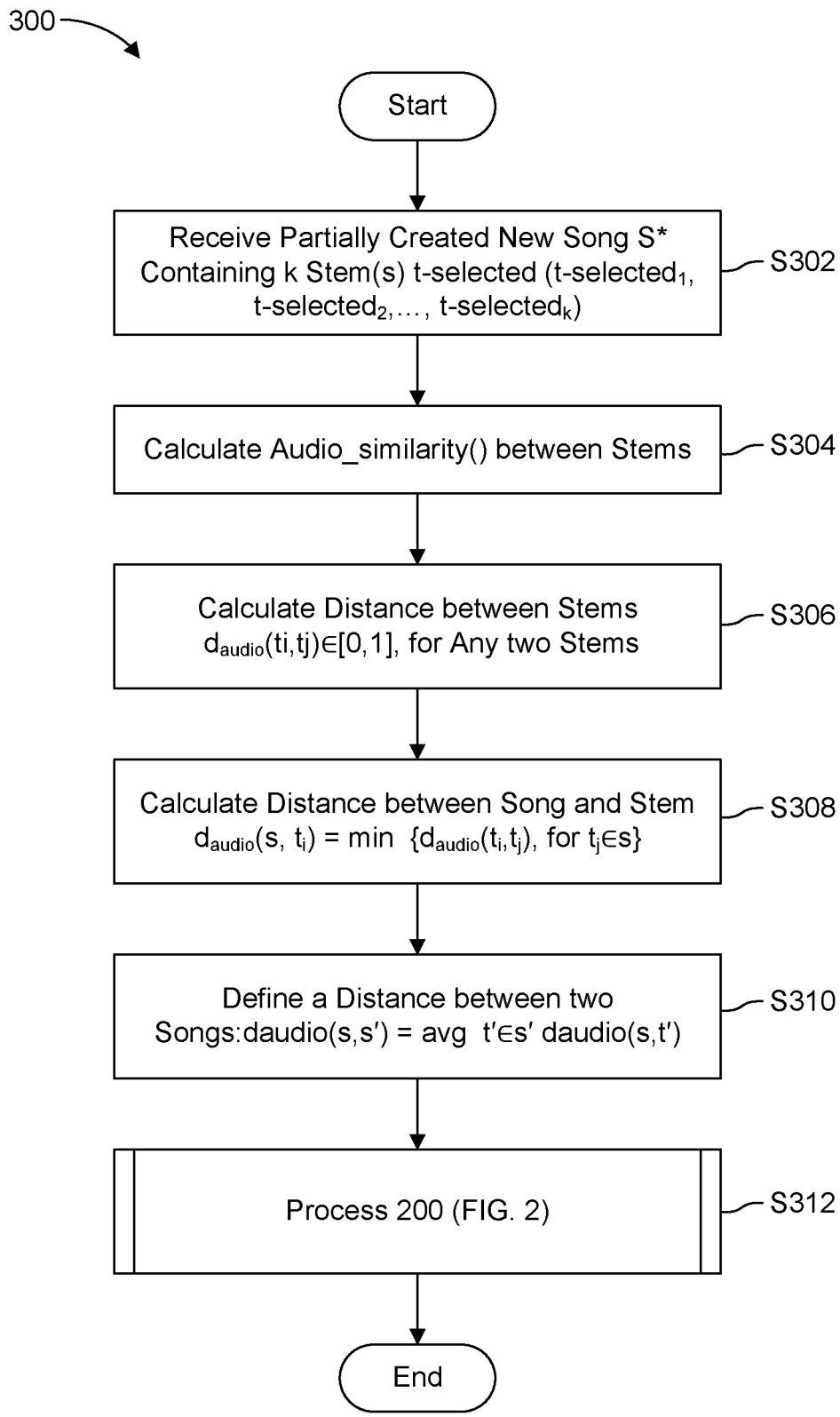
FIG. 3 illustrates a stem identification process utilizing audio similarity according to an example embodiment of the present invention.

FIG. 3 illustrates a stem identification process 300 according to an example embodiment of the present invention. The stem identification process 300 can be stored as instructions in a non-transitory computer readable medium that when executed by a stem processor (e.g., stem processor 410 described below in connection with FIG. 4) cause the stem processor to perform process 300. In this example embodiment, stem identification is performed by using an audio similarity (AS) algorithm to find other audio stems that sound similar to the proposed stems.

In some example embodiments, stems are identified by using both an audio similarity algorithm that finds other audio stems that sound similar to the proposed stems as well as the collaborative filtering audio stem identification technique discussed above in connection with FIG. 2. This extends considerably the stems that can be identified for a user via, for example, an audio editor 112 and advantageously produces a variety of new stems.

Audio similarity (AS) can be computed by various means now known or future developed. In an example embodiment, a Gaussian Mixture Model (GMM) of the Mel Frequency Cepstral Coefficients (MFCC) for each stem is computed. Then the models are compared, for instance, by Monte Carlo estimation. This comparison yields a timbre similarity (also called audio similarity). In some embodiments, audio features other than the MFCC coefficients can be considered.

Generally, users generate media content items (e.g., songs) using an editing tool such as an audio editor 112 by assembling a group of audio stems. The assembled group of stems are sometimes herein referred to as pre-selected group of stems, simply selected group of stems, k selected audio stem(s), or t-selected (t-selected$_1$, t-selected$_2$, ..., t-selected$_k$, where k is an integer).

In block S302, each of the k selected audio stem(s) t-selected (t-selected$_1$, t-selected$_2$, ..., t-selected$_k$) is received. In turn the k selected audio stems t are processed to determine if there exists one or more (n) corresponding new audio stems t-new (t-new$_1$, t-new$_2$, ..., t-new$_n$, where n is an integer) in audio stem database 104. The new audio stem(s) t-new can be of a certain type (e.g. a guitar stem, drum stem, and the like), correspondingly.

In some embodiments, a ranking measure for an audio stem is performed by defining an audio similarity function audio_similarity( ) as shown in block S304. Audio similarity function audio_similarity( ) determines the similarity between two (2) stems stem t and stem t'.

In some embodiments, parameters are added to this function, where the parameters are tuned on a test database (not shown).

In an example embodiment, given stems t ($t_1, t_2, ..., t_N$), song s∈$\{0,1\}^N$ is a vector with value one (1) at position i if stem $t_i$ is used in song s, where i and N are integers. In an example embodiment, s represents songs in the audio stem database 104 S ($S_1, S_2, ..., S_P$, where P is an integer).

The distance between two song vectors, song vector s and song vector s', is the cosine distance between the two vectors, e.g., dcos(s,s').

In the case where there exists an audio similarity measure between stems stem $t_i$ and stem $t_j$, and therefore a distance between stems $d_{audio}(t_i,t_j)$∈[0,1], for any two stems, in block S306, there is defined a distance between songs, based on $d_{audio}$ by defining a distance between a song and a stem (S308) according to the following equation (2):

$$d_{audio}(s,t_i)=\min\{d_{audio}(t_i,t_j), \text{ for } t_j \in s\}, \quad (2)$$

and a distance between two songs according to the following equation (3) (S310):

$$d_{audio}(s,s')=\text{avg}_{t' \in s'} d_{audio}(s,t'), \quad (3)$$

where i, j are integers, s and s' represent songs vectors (e.g., song vector s and song vector s'), and t and t' represent two stem vectors, where s represents songs in the audio stem database 104 S ($S_1, S_2, ..., S_P$, where P is an integer).

In block S312, process 200 described above in connection with FIG. 2 is performed.

In an alternative embodiment, stem identification is based on lead sheet similarity, e.g., if the lead sheet of song X is similar to the lead sheet of an existing song, stems used in the existing song are identified. The lead sheets could be either known in advance or extracted automatically.

Example Stem Identification Using Machine Learning

Figure 4:
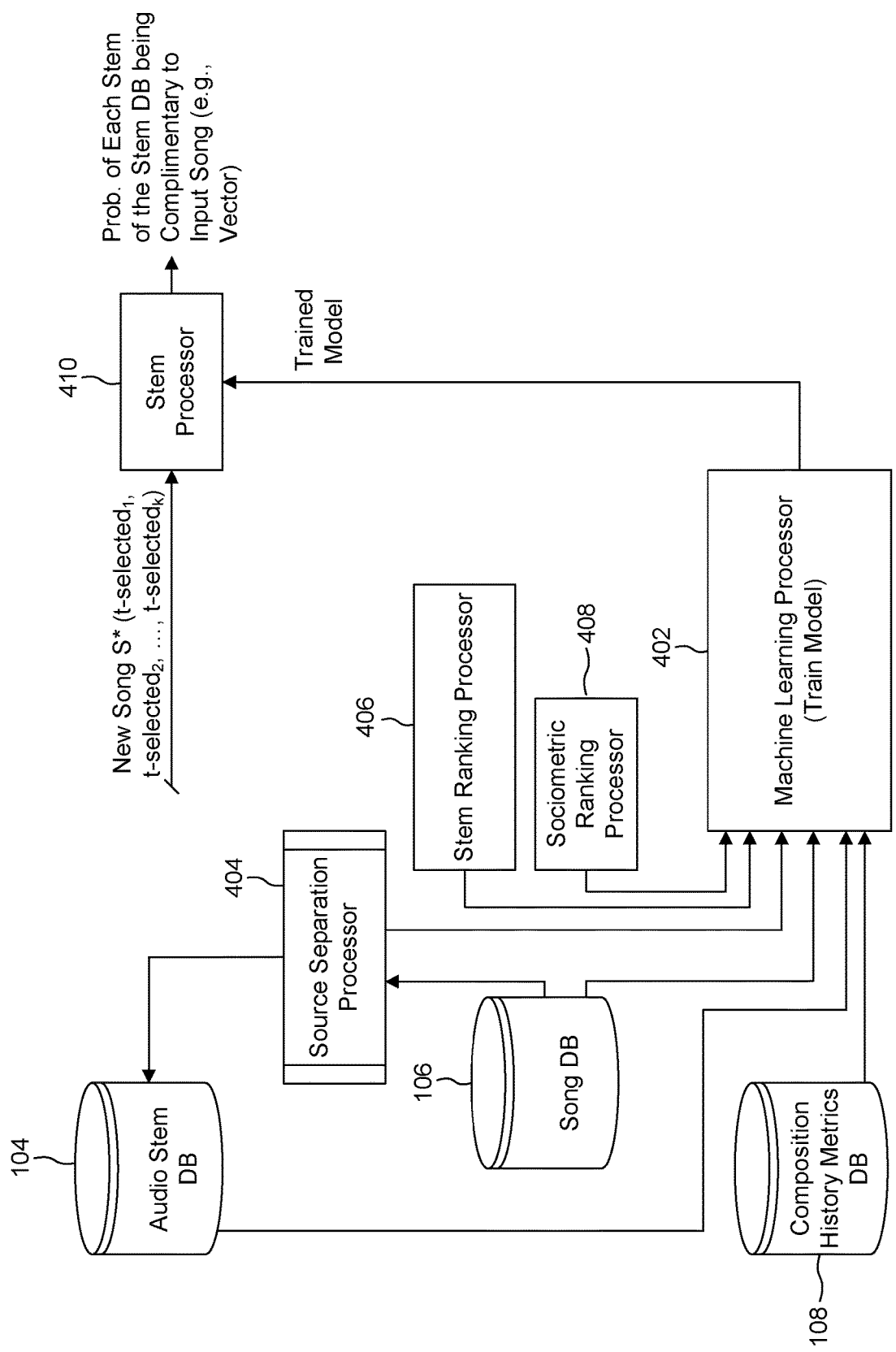
FIG. 4 illustrates a stem identification process utilizing machine learning according to an example embodiment of the present invention.

FIG. 4 illustrates a stem identification process utilizing machine learning according to an example embodiment of the present invention. As shown in FIG. 4, audio stem database 104 can be built or populated in different ways. In one embodiment, a source separation processor 404 performs source separation on the media content items stored in song database 106. Particularly, source separation processor 404 separates from the songs in song database 106 the individual stems that, when mixed, form the song.

In another example embodiment, stems need not come from a source separation process. In this embodiment, the stems are stems derived from existing multitrack recordings.

In turn, source separation processor 404 feeds the stems to audio stem database 104. Audio stem database 104 is arranged to store plural audio stems. In some embodiments, audio stem database 104 stores audio stems in an encoded format (e.g., .wav, .mp3, .m4a, .ogg, .wma, etc). In some embodiments, other audio stems are retrieved from other sources and stored in audio stem database 104.

In some embodiments, stem identification processor 102 is coupled to a composition history metrics database 108.

Composition history metrics database 108 stores records associated with composers. Particularly composition history metrics database 108 stores records identifying attributes associated with a composition history metrics of a composer. For example, composition history metrics database 108 can be configured to store records identifying the types of sounds, rhythmic patterns, harmonies, and the like, that a composer typically uses. In some embodiments, composition history metrics database 108 stores rankings that are weighted by a set of composition metrics. In one implementation, the composition metrics include data representing acoustic properties, sociometric ratings, uniqueness values, and the like.

In some embodiments, a machine learning processor 402 is fed audio stem data from audio stem database 104. In some embodiments, machine learning processor 402 is fed song data from song database 106. In some embodiments, machine learning processor 402 is fed user composition history metrics data from composition history metrics database 108.

In some embodiments, machine learning processor 402 also receives ranked stems. The ranked stems can be determined by a stem ranking processor 406 that is arranged to collect stems that have been used and ranked. The stems can be collected and ranked according to a stem ranking process described above.

In some embodiments, machine learning processor 402 also receives media content item sociometric rankings (e.g., a measure of the sociometric ranking values of a song). Quantitative sociometric values corresponding to a song can be calculated by a media content item sociometric ranking processor 408.

A method for identifying an audio stem according to one aspect includes storing, on audio stem database 104, a plurality of audio stems t ($t_1, t_2, ..., t_N$). In some example embodiments, the method includes storing, on a song database, a plurality of songs S ($S_1, \ldots, S_P$) made with at least a subset of the plurality of audio stems ($t_1, \ldots, t_N$). The method includes receiving, by a stem processor 410, at least partially composed song (S*) having a predetermined number of pre-selected stems. The assembled group of stems are sometimes herein referred to as pre-selected group of stems, simply selected group of stems, k selected audio stem(s), or t-selected (t-selected$_1$, t-selected$_2$, ..., t-selected$_k$, where k is an integer). The method further includes producing a probability vector (or relevance value or ranking) for each stem ($t_1, t_2, \ldots, t_N$) to be complementary to the at least partially composed song (S*).

In some embodiments, machine learning processor 402 is trained based on the stem data, the song data, the sociometric status data of the song, and the stem ranking data. In some cases the machine learning processor is trained on the user composition history metrics data. The method further includes predicting, by a stem processor using a trained machine learning model generated by machine learning processor 402, at least one stem from the audio stem database 104 having a probability value above a predetermined threshold. The predetermined threshold defines whether the at least one stem is complementary to the predetermined number of preselected stems t-selected (t-selected$_1$, t-selected$_2$, ..., t-selected$_k$).

In some embodiments, the method includes training, using machine learning processor 402, a machine learning model based on any one of (i) a measure of success of a stem, (ii) a rank order of sociometric status values corresponding to a plurality of songs including at least the stem, (iii) a plurality of stems obtained from plural songs, or any combination of (i), (ii) and (iii).

It would also be desirable to not limit queries and targets to stems and to be able to allow both queries and targets to be submixes (e.g. containing multiple instruments). For example, it would be useful to be enabled to use only the audio corresponding to a mixture (e.g., everything except for vocals in one single audio file) to search for an audio stem (e.g., vocals).

It would also be useful to be able to identify an accompaniment for a given stem.

In addition, it would be useful to not require a list of individual stems from the query song.

Still further it would be useful to not require collaborative filtering and therefore, not require stems to be used in multiple songs.

In the following example implementation, audio similarity is moved to audio "complementarity" by transforming the acoustic feature vector space into another space, where related stems and mixtures (those from the same song) are closely located.

In this example implementation, information about the sociometric status value of a song is not needed or explained. In addition, stems are identified by finding neighbors directly in a vector space referred to as a complementarity space. A complementarity space is a vector space in which the vectors representing stems which have been and/or could be used in the same media content item (e.g., song) are close together. The complementarity space has a lower dimensionality than the original space which allows the stem identification system to perform relatively faster processing.

Figure 5:
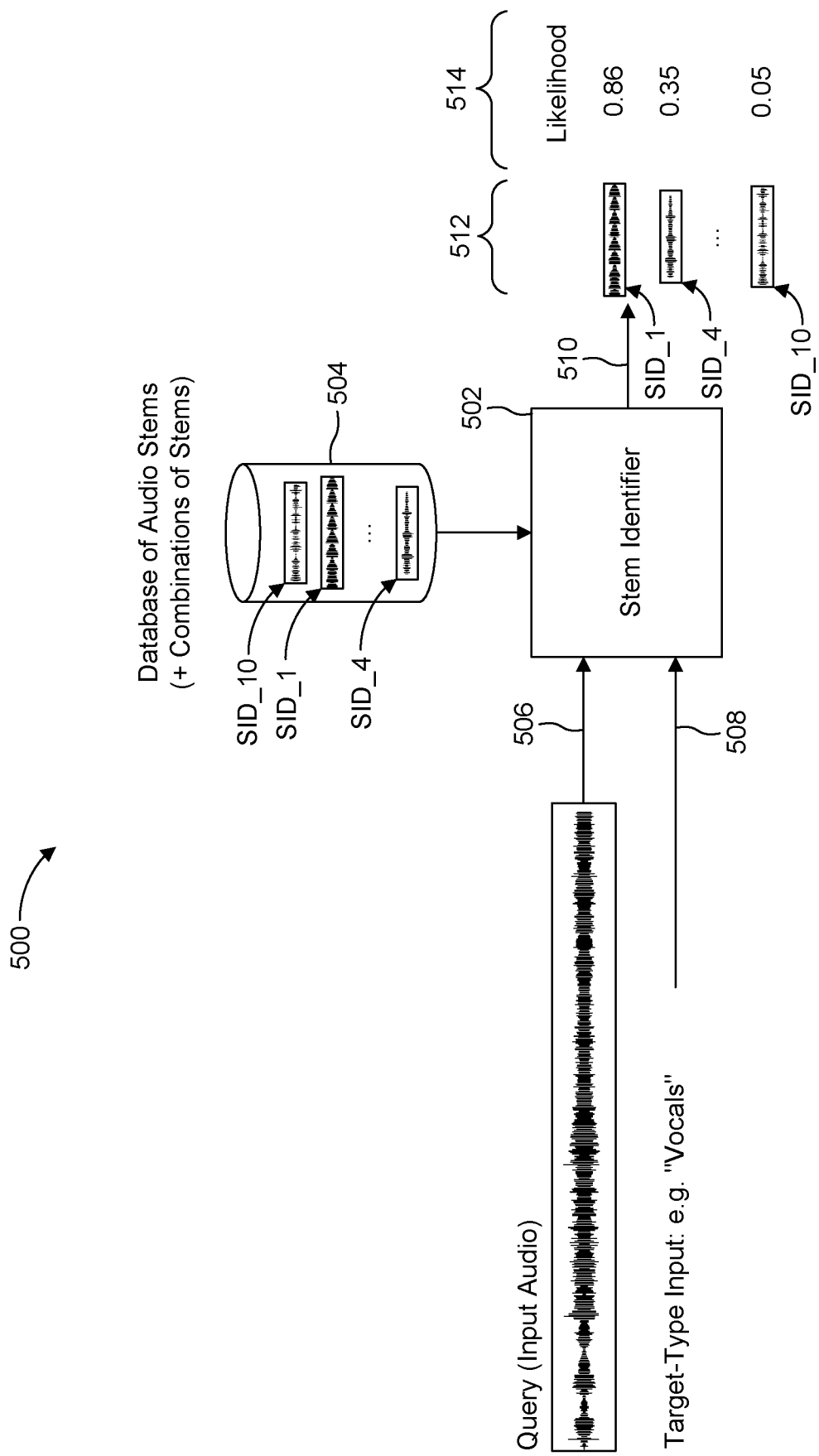
FIG. 5 illustrates an example stem identification system in accordance with an embodiment of the present invention.

FIG. 5 illustrates an example stem identification system in accordance with an embodiment of the present invention. As shown in FIG. 5, stem identification system 500 includes a stem identifier 502 and a stem database 504. Stem identifier 502 includes at least one processor and a memory storing instructions which when executed by the at least one processor cause the at least one processor to receive a query via a query input 506 of the stem identifier 502 and a target input type via a target-type input 508 of the stem identifier 502, and provide stem identifications 512 via an output 510 of the stem identifier 502.

In an example implementation, given a query containing one or more stems that do not contain any vocals (e.g., input audio containing audio content such as drums, guitars, etc.) and a target input audio type (e.g., vocals), the stem identification system 500 outputs stem identifications. The stem identifications are selected from the plural stems stored in stem database 504. In an example embodiment, the output is in the form of an ordered list of stem identifications of stems including vocals, referred to as vocal stems. In an example embodiment the ordered pair of stem identifications includes a stem identifier (e.g., SID_1, SID_4, ..., SID_10) and a corresponding likelihood value 514 (e.g., from 0-1) corresponding to a probability a particular identification is a match for a particular query and target input type. In an example embodiment, a likelihood value is obtained by first computing the distance (D) in a space referred to herein as a "complementarity space" between a vector of the query and a vector of each of the stems in the stem database 504. Alternatively, a likelihood value is obtained by first computing the distance (D) in the complementarity space between a vector of the query and the closest vector of each of the stems in the stem database 504. In turn, this distance is normalized as L=1−D/max_distance, where max_distance corresponds to a maximum possible distance in a given space (e.g., an N dimensional hypercube) using a given distance metric (e.g. Euclidean distance). In an example implementation an acoustic feature vector is generated for each stem in stem database 504. An acoustic feature vector describes acoustic and musical properties of a given recording. In some embodiments, an acoustic feature vector is created manually, by manually quantifying the amount of given properties, (e.g., vibrato, distortion, presence of vocoder, energy, valence, etc). In other embodiments, the acoustic feature vector is created automatically (which is the case in the implementations described herein), (e.g., using an amplitude of the signal, a time-frequency progression, or more complex features). An example of a more complex feature which is derived directly from the audio signal is an intermediate layer embedding of a neural network trained to predict latent factors used for media content item recommendation. It should be understood that other now known or future methods for determining an acoustic feature to generate acoustic feature vectors can be used and still be within the scope of the present invention. The acoustic feature vectors are in a first vector space which is referred to sometimes as an original vector space.

In turn, the acoustic feature vectors are mapped to a second vector space having a lower dimension. A vector space having a lower dimension is sometimes referred to as a reduced vector space.

Example Stem Identification System

Figure 6:
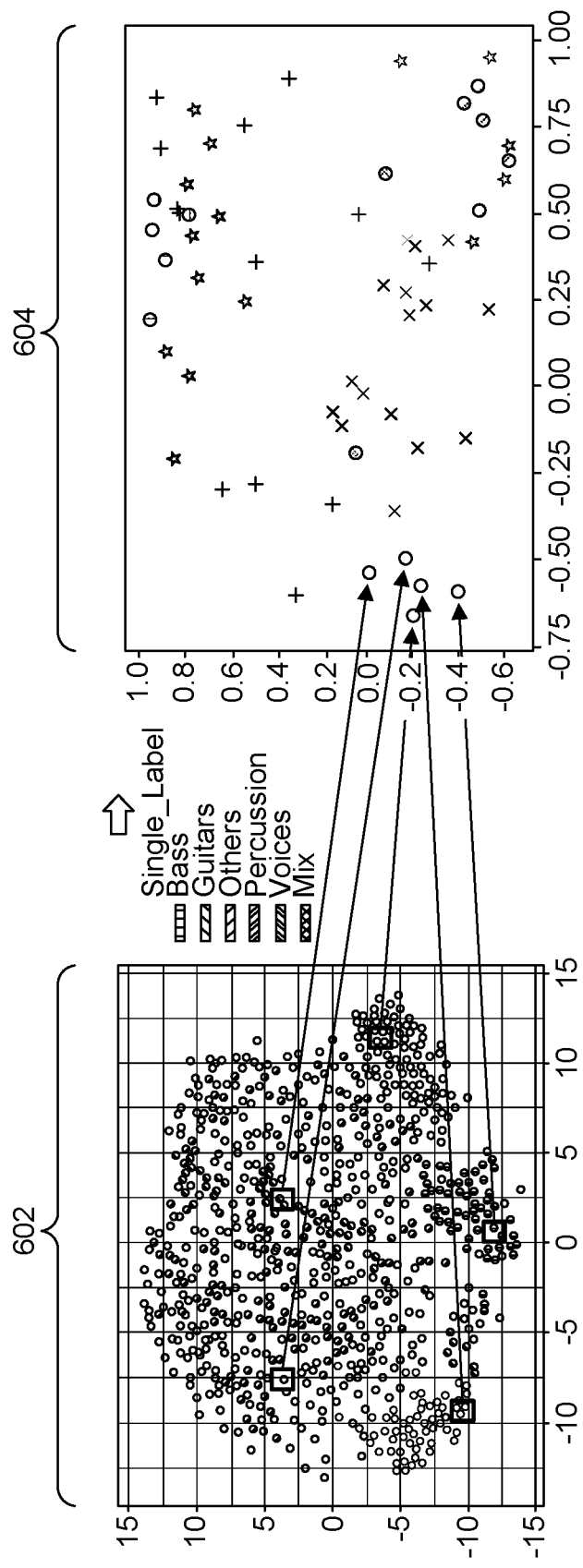
FIG. 6 illustrates a mapping of stems of songs in an original vector space into a second space (with reduced dimensionality) in accordance with an example embodiment of the present invention.

"FIG. 6 illustrates a mapping of stems of songs in an original vector space into a second space (with reduced dimensionality) in accordance with an example embodiment of the present invention. In the second space, the vectors representing stems that have been used in the same media content item (e.g., song) are mapped together. The second space is the complementarity space. In this example, the complementarity space is a vector space in which the vectors representing stems which have been and/or could be used in the same media content item (e.g., song) are close together.

As described in more detail below in connection with FIG. 6, in an example embodiment, a mapping function (f) is iteratively trained to reduce the distance between complementary stems or mixtures of stems (stems belonging to the same song), and to increase the distance of non-complementary stems. Consequently, as shown in FIG. 5, the vectors representing stems that have been used in the same media content item are mapped close together.

It should be understood by those skilled in the art that FIG. 6 depicts a 2D representation of the multidimensional spaces for illustrative purposes only.

Particularly, FIG. 6 shows the acoustic feature vectors representing the stems in stem database 504 in a so-called original vector space 602. FIG. 6 also shows a reduced vector space referred to herein as the second vector space 604 and a mapping of the stems in the original vector space 602 into the second vector space 604. The squares in original vector space 602 represent vectors of stems which are used in the same song (e.g., bass, guitars, vocals, percussion). As shown in FIG. 6, the acoustic feature vectors (i.e., the squares) from the same song in the original vector space 602 are far in the original vector space 602, but are closer together in the second vector space 604.

The distribution of vectors in the second vector space 604 is, in turn, used to identify items from the same songs, and/or items that are complementary. This can be achieved by training a mapping function using a machine learning algorithm, such that complementary audio items are closer in the second vector space 604 according to a given distance metric. In this way, complementary items can be more easily identified. The lower dimensionality of the second vector space allows the identification to be performed more efficiently (e.g., using less processing energy and/or time).

Figure 7:
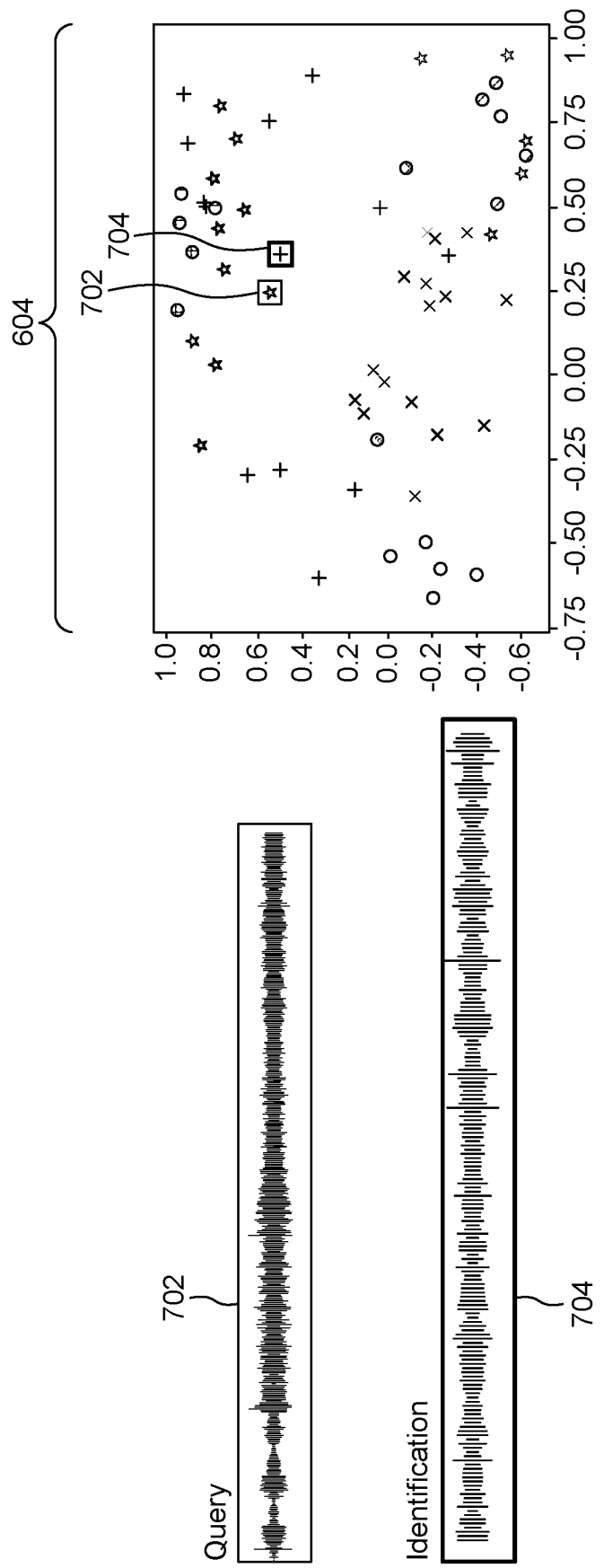
FIG. 7 illustrates an example query and an identified stem in a reduced vector space in accordance with an example implementation.

FIG. 7 illustrates an example query and an identified stem in a reduced vector space in accordance with an example implementation. As shown in FIG. 7, given a query audio 702, a vector in the second vector space 604 is obtained by mapping its acoustic feature vector. The closest candidate in the second vector space 604 is determined, in some embodiments, based on distance. Once the closest candidate is determined, it is provided via the output 510 of the stem identifier as an identified stem 704. Those skilled in the art will recognize that FIG. 7 depicts a 2D representation of the multidimensional space for illustrative purposes.

Thus, referring to both FIGS. 5 and 6, a query audio (e.g. song missing vocals) can be provided for the purpose of finding from the stem database 504 a compatible stem (e.g. a compatible vocal track). The compatible stem is referred to as a target.

To constrain the identification to specific instruments, the database can be tagged with instrument types, which could be done both manually by the users who uploaded the sounds, or automatically (e.g., using an instrument classifier trained on stems).

Example Stem Identification Process

A method for identifying at least one audio content item (e.g., at least one audio stem) among a plurality of target audio content items (e.g., at least one audio stem) will now be described. The method includes determining a target acoustic feature vector of each of the plurality of target audio content items in a first vector space and, in turn, mapping each target acoustic feature vector from the first vector space to a second vector space. In this example, the second vector space has a lower dimension than the first vector space. The method also performs determining a query acoustic feature vector of a query audio content item in the second vector space, comparing the query acoustic feature vector and the plurality of target acoustic feature vectors in the second vector space, and identifying, based on the comparison, at least one audio content item in the plurality of target audio content items that is related to the query audio content item. Each audio content item comprises a subset of a plurality of music stems comprised in a music track.

In some embodiments, a distance between the acoustic feature vectors of related audio content items is less in the second vector space than in the first vector space. In some embodiments, mapping the target acoustic feature vectors includes using a mapping function determined using a machine learning algorithm as will be described below in more detail in connection with FIGS. 8, 9 and 10.

The mapping function can be determined, for example, using a Siamese neural network.

The mapping function can be determined using at least two reference acoustic feature vectors in the first vector space as inputs to the machine learning algorithm, wherein first and second reference acoustic feature vectors are determined from media content items from a first music track.

The mapping function can also be determined iteratively, such that the distance between the first and second reference acoustic feature vectors in the second vector space is reduced at each iteration. The mapping function can be determined using a third reference acoustic feature vector as a further input to the machine learning algorithm, where the third acoustic feature vector is determined from a media content item not from the first music track.

In some embodiments, the mapping function is determined iteratively, such that the distance between the first and third reference acoustic feature vectors in the second vector space is increased at each iteration.

In some embodiments, comparing the acoustic feature vectors includes determining a distance between the query acoustic feature vector and each target acoustic feature vector in the second vector space.

In some embodiments, identifying at least one audio content item in the plurality of target audio content items that is related to the query audio content item includes identifying the target acoustic feature vector having the smallest distance to the query acoustic feature vector in the second vector space.

In some embodiments, a music stem represents at least one instrumental or vocal stem of a music track.

The query audio content item can be a single stem (vocal or instrumental). Alternatively, the query audio content item can be a mixture of stems.

In some embodiments, target audio content items that are related to the query audio content item are audio content items from the same music track as the query audio content item. In some embodiments, target audio content items that are related to the query audio content item are audio content items that are complementary to the query audio content item.

Example Architecture for Training a Stem Identification Model

Figure 8:
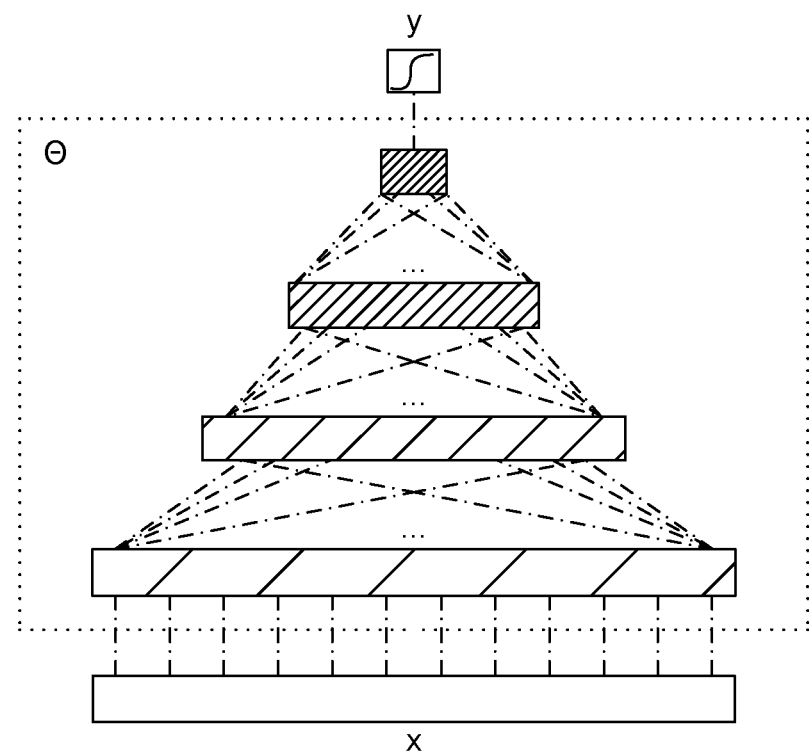
FIG. 8 depicts a block diagram of a network that performs the mapping between an input acoustic feature vector (x) in space X, to the space Y, according to an embodiment of the present invention.
Figure 9:
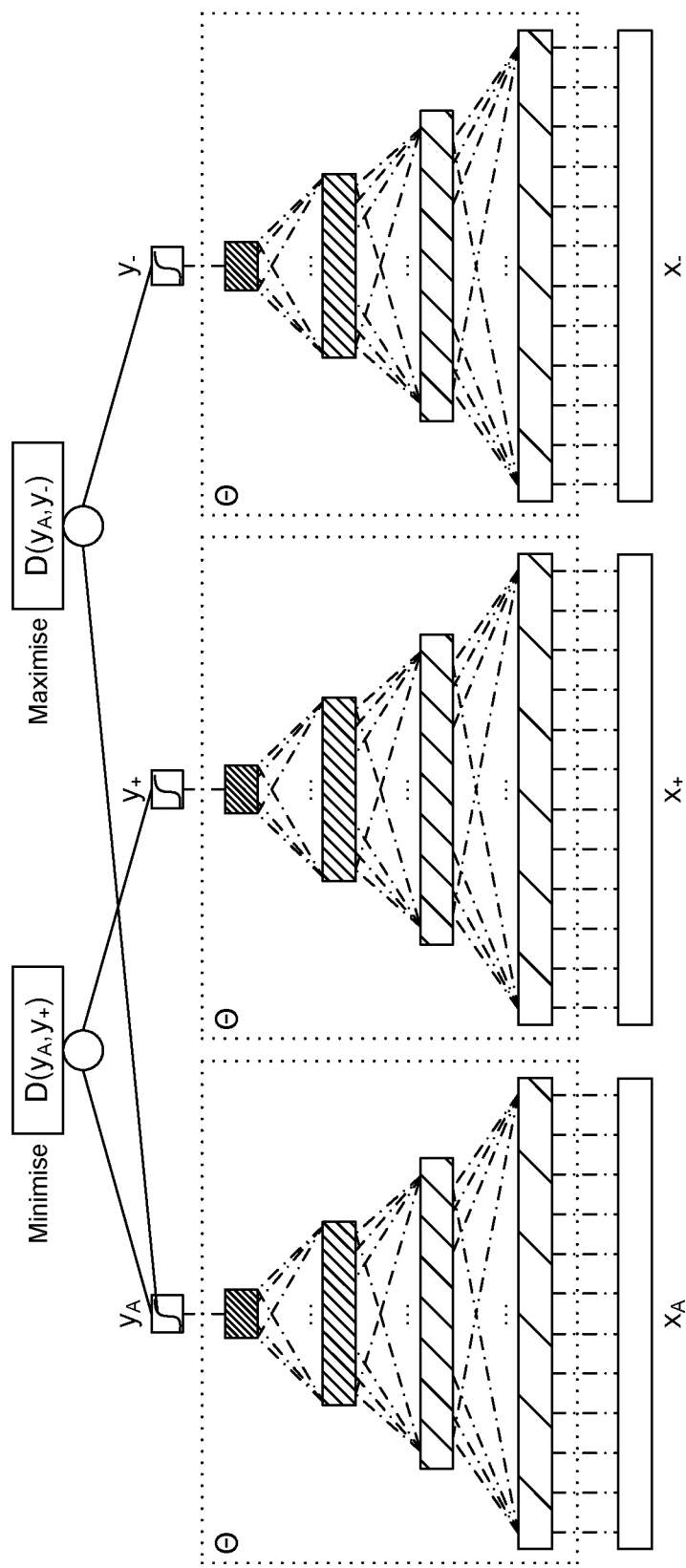
FIG. 9 depicts a Siamese Network which is used to estimate such parameters, according to an embodiment of the present invention.
Figure 10:
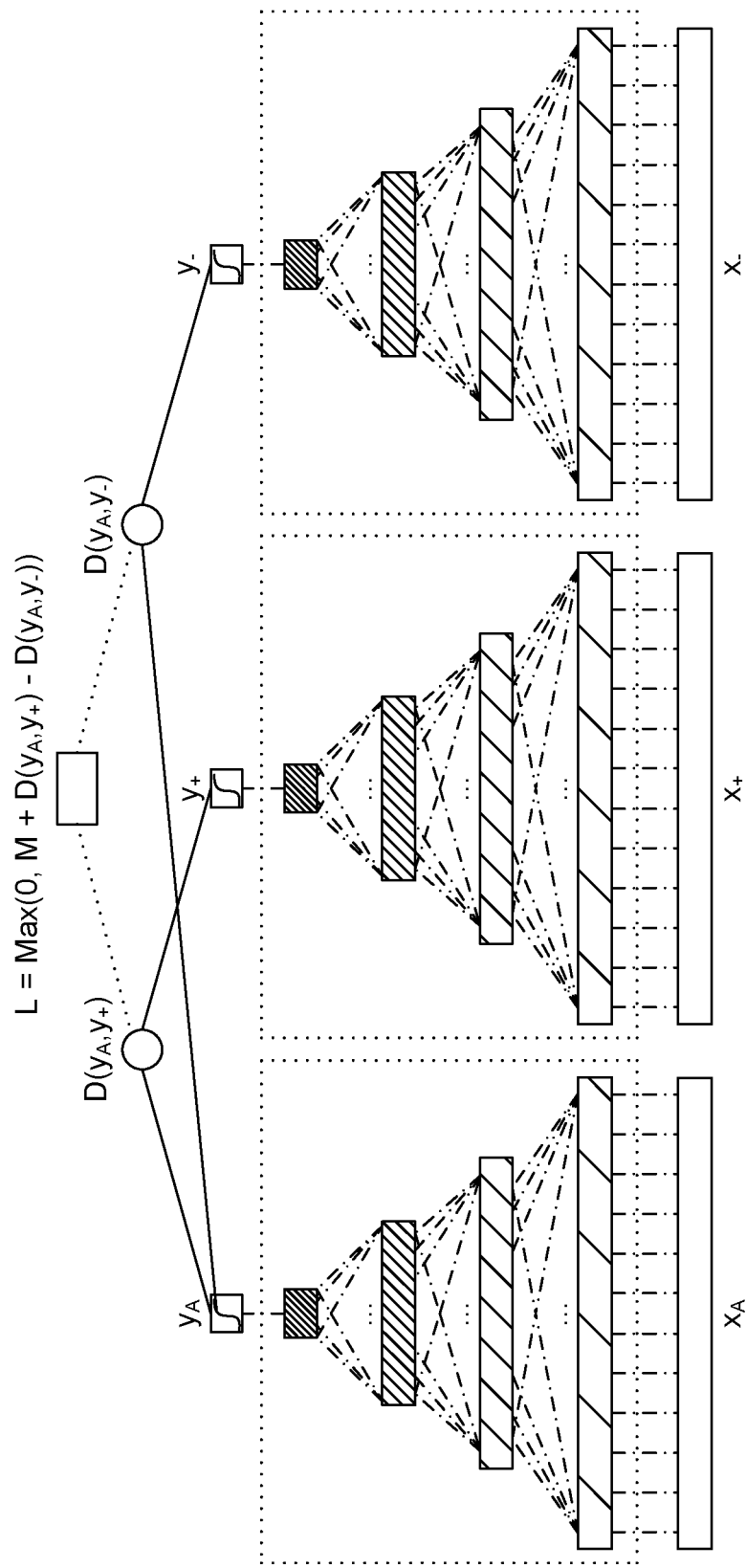
FIG. 10 illustrates how parameters θ of a network are learned using a loss function (L) in accordance with an example embodiment of the present invention.

FIGS. 8, 9 and 10 describe in more detail an example architecture for training a stem identification model in accordance with an embodiment of the present invention. Referring to FIGS. 6, 8, 9 and 10 generally, a function (f) is learned with parameters θ to map an acoustic feature vector x in the original vector space 602 to a vector y in a lower dimensional space, i.e., second vector space 604). For convenience, the original vector space 602 is sometimes referred to as X space or first vector space and the second vector space 604 is referred to as reduced vector space or Y space. As noted above, the second vector space 604 may also be referred to as a complementarity space.

In the second vector space 604, vectors corresponding to complementary stems are ideally closely located, and the vectors from non-complementary stems are ideally located further apart. The mapping function (f) (parametrized by θ) is iteratively trained to reduce the distance between complementary stems or mixtures of stems (stems belonging to the same song), and to increase the distance of non-complementary stems. The values of the parameters θ to obtain the best function approximation can be learned from data in one of several ways.

FIG. 8 depicts a block diagram of a network that performs the mapping between an input acoustic feature vector (x) in space X to the space Y, such that y=f(x). In this example, the function (f) is defined by a feedforward network, and is parametrized by a set of values θ. As shown in FIG. 8, the input acoustic feature vector (x) which typically corresponds to a given stem is depicted. The output acoustic feature vector y=f(x) is obtained by passing input acoustic feature vector (x) through the feedforward network.

FIG. 9 depicts a Siamese Network which is used to estimate such parameters, according to an embodiment of the present invention. A Siamese network is an artificial neural network that uses the same weights while working in tandem on two (or more) different input vectors to compute the output vectors. In this example, a Siamese Network is used for estimating the set of parameters θ that define function f.

As described above with reference to FIG. 5, in some embodiments, a stem database 504 is configured to store audio stems of songs. The stem database 504 can also contain combinations of stems. In addition, the stem database can store additional metadata about songs. The data in stem database 504 are used to train the network depicted in FIG. 8. Stems that belong to the same song are considered complementary of each other. An assumption is made that any sum of a set of stems of a song is also complementary with each of the remaining stems which form the song. This enables stem identification, for example when the query is a single audio file. For example, given a recording which contains all instruments except a guitar, a network trained with this data can be used to find a complementary guitar stem. In some embodiments, such a trained network can also be used to find a complementary stem (or complementary mix of stems) for a single stem (e.g. vocals, guitars . . . ).

Referring again to FIG. 9, FIG. 9 illustrates an example mapping of three acoustic feature vectors. The acoustic feature vectors x (i.e., the acoustic feature vectors associated with the audio files, e.g., stems or a mixture of stems) are derived, in part, from the stems stored in stem database 504. As shown in FIG. 9, training the network involves three acoustic feature vectors: $x_A$ (an anchor) and x+ (a positive example) and x− (a negative example). A positive example x+ corresponds to the acoustic feature vector of a stem (or a mixture of stems) which is used in the same song as the anchor stem, whose acoustic feature vector is $x_A$.

After some layers of a feedforward network, a Hyperbolic tangent function TANH(x) is applied, and the mapping of each of the three additional vectors: $y_A$ (an anchor) and y+ (a positive example) and y− (a negative example) is obtained. In this example, $y_A$ and y+ are close in the space since they belong to the same song, and $y_A$ and y− are far apart since they belong to different songs.

FIG. 10 illustrates how parameters θ of a network are learned using a loss function (L) in accordance with an example embodiment of the present invention. A loss function or cost function is a function that maps an event or values of one or more variables onto a real number intuitively representing some "cost" associated with the event. An optimization problem seeks to minimize a loss function. In some example embodiments, parameters θ of the network are learned using backpropagation with mini-batch gradient descent, using a loss function computed according to the following equation (4):

$$L=\max(0,M+D(y_A,y-)-D(y_A,y-)), \tag{4}$$

where D(x,y) represents a Euclidean distance between vectors x and y, and M, a margin value, for example, where M=0.3.

In some embodiments, the vectors in Y space can be precomputed for the whole database of stems. In turn, the vector y is computed for a query audio and neighbors in the Y space are located using, e.g., Euclidean distance.

A practical application of embodiments described herein include identifying audio stems for the purpose of assembling them. The assembled plurality of audio stems can result in media content that can be played via a playback device. In some embodiments, the media content is in the form of a media content item in the form of a file that can be streamed, saved, mixed with other media content items, and the like.

Not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, service, application, module, unit, logic, and so on) as taking an action or causing a result. Such expressions are merely a shorthand way of stating that the execution of the software by a processing system causes the processor to perform an action to produce a result.

Various operations and processes described herein can be performed by the cooperation of two or more devices, systems, processes, or combinations thereof.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

What is claimed is:

1. An audio content item identifier, comprising:
   at least one processor; and
   at least one memory storing instructions which when executed by the at least one processor cause the at least one processor to:
   receive, by a client device, a query corresponding to a query audio content item;
   determine a query vector corresponding to the query audio content item;
   compare, in a vector space, the query vector and a plurality of target vectors corresponding to a plurality of target audio content items, to determine likelihood values indicating, for each respective target audio content item of the plurality of target audio content items, a probability that the respective target audio content item is a match for the query audio content item, wherein the query audio content item and the target audio content items are audio stems that are configured to be inserted into an audio content item during an audio content item creation process; and
   output, to an editor tool, information identifying one of the plurality of target audio content items having a highest of the likelihood values.

2. The audio content item identifier of claim 1,
   wherein the instructions, when executed by the at least one processor further cause the at least one processor to:
   generate, by the editor tool, another audio content item based on the query audio content item and the information; and
   play back, by the client device, the another audio content item.

3. The audio content item identifier of claim 2, wherein the editor tool assembles together the audio stems of the query audio content item and the one of the plurality of target audio content items having the highest of the likelihood values to generate the another audio content item.

4. The audio content item identifier of claim 1,
   wherein the query includes a first audio type for the query audio content item;
   wherein the plurality of target audio content items have at least one second audio type; and
   wherein the first audio type is different from the at least one second audio type.

5. The audio content item identifier of claim 4, wherein the query includes the at least one second audio type for the plurality of target audio content items.

6. The audio content item identifier of claim 4,
   wherein the first audio type is one of vocals or instrumentals; and
   wherein the at least one second audio type is the other of vocals or instrumentals.

7. The audio content item identifier of claim 1, wherein the query vector and the plurality of target vectors are acoustic feature vectors.

8. The audio content item identifier of claim 7, wherein acoustic features of the acoustic feature vectors include one or more of: vibration, distortion, presence of a vocoder, energy, valance, signal amplitude, and time-frequency progression.

9. The audio content item identifier of claim 1, wherein the information identifies two or more of the plurality of target audio content items having the highest of the likelihood values.

10. A method of identifying an audio content item, comprising:
   receiving, by a client device, a query corresponding to a query audio content item;
   determining a query vector corresponding to the query audio content item;
   comparing, in a vector space, the query vector and a plurality of target vectors corresponding to a plurality of target audio content items, to determine likelihood values indicating, for each respective target audio content item of the plurality of target audio content items, a probability that the respective target audio content item is a match for the query audio content item, wherein the query audio content item and the target audio content items are audio stems that are configured to be inserted into an audio content item during an audio content item creation process; and
   outputting, to an editor tool, information identifying one of the plurality of target audio content items having a highest of the likelihood values.

11. The method of claim 10, further comprising:
   generating, by the editor tool, another audio content item based on the query audio content item and the information; and
   playing back, by the client device, the another audio content item.

12. The method of claim 11, wherein the editor tool assembles together the audio stems of the query audio content item and the one of the plurality of target audio content items having the highest of the likelihood values to generate the another audio content item.

13. The method of claim 10,
   wherein the query includes a first audio type for the query audio content item;
   wherein the plurality of target audio content items have at least one second audio type;
   wherein the first audio type is different from the at least one second audio type; and
   wherein the query includes the at least one second audio type for the plurality of target audio content items.

14. The method of claim 13,
   wherein the first audio type is one of vocals or instrumentals; and
   wherein the at least one second audio type is the other of vocals or instrumentals.

15. The method of claim 10, wherein the query vector and the plurality of target vectors are acoustic feature vectors.

16. The method of claim 15, wherein acoustic features of the acoustic feature vectors include one or more of: vibration, distortion, presence of a vocoder, energy, valance, signal amplitude, and time-frequency progression.

17. The method of claim 10, wherein the information identifies two or more of the plurality of target audio content items having the highest of the likelihood values.

18. A non-transitory computer-readable medium having stored thereon one or more sequences of instructions for causing one or more processors to perform:
   receiving, by a client device, a query corresponding to a query audio content item;
   determining a query vector corresponding to the query audio content item;
   comparing, in a vector space, the query vector and a plurality of target vectors corresponding to a plurality of target audio content items, to determine likelihood values indicating, for each respective target audio content item of the plurality of target audio content items, a probability that the respective target audio content item is a match for the query audio content item, wherein the query audio content item and the target audio content items are audio stems that are configured to be inserted into an audio content item during an audio content item creation process; and
   outputting, to an editor tool, information identifying one of the plurality of target audio content items having a highest of the likelihood values.

* * * * *